United States Patent [19]

Burgdorf et al.

[11] Patent Number: 4,786,118
[45] Date of Patent: Nov. 22, 1988

[54] TRACTION-SLIP-CONTROLLED BRAKE SYSTEM FOR AUTOMOTIVE VEHICLES

[75] Inventors: Jochen Burgdorf, Offenbach-Rumpenheim; Dieter Kircher, Frankfurt am Main; Lutz Weise, Mainz, all of Fed. Rep. of Germany

[73] Assignee: Alfred Teves GmbH, Frankfurt am Main, Fed. Rep. of Germany

[21] Appl. No.: 62,444

[22] Filed: Jun. 15, 1987

[30] Foreign Application Priority Data

Jun. 23, 1986 [DE] Fed. Rep. of Germany ....... 3621000

[51] Int. Cl.$^4$ .............................................. B60T 8/62
[52] U.S. Cl. ...................................... 303/110; 303/116
[58] Field of Search ..................... 180/197; 303/92, 93, 303/96, 97, 103, 110, 111, 113, 116, 119

[56] References Cited

U.S. PATENT DOCUMENTS 4,565,411 1/1986 Seiber .................................. 303/110
4,662,687 5/1987 Leiber ................................. 303/110

Primary Examiner—Duane A. Reger
Attorney, Agent, or Firm—James B. Raden

[57] ABSTRACT

In a traction slip-controlled brake system for automotive vehicles, comprising an auxiliary pressure source and a pedal-operated brake valve through which pressure fluid from the auxiliary pressure source can be applied to the wheel brakes. A first valve switchable from a locking position into a passage position is switched into a pressure fluid conduit leading from the auxiliary pressure source to the wheel brakes of the one motor vehicle axle, and a second valve is switched into the brake conduit connecting the wheel brakes of the said motor vehicle axle to the brake valve. The said second valve can switch over from a passage position into a locking position. Moreover, a check valve is provided in the line section connecting the first valve to the wheel brakes of the one motor vehicle axle, with the said check valve precluding a flow back of pressure from the wheel brakes to the first valve. An additional third valve is provided in a line connecting this line branch to the return line which valve, in non-excited condition, for safety reasons, will then open the communication with the pressure fluid reservoir.

6 Claims, 4 Drawing Sheets

TRACTION-SLIP-CONTROLLED BRAKE SYSTEM FOR AUTOMOTIVE VEHICLES

BACKGROUND OF THE INVENTION

The present invention is concerned with a traction slip-controlled brake system for automotive vehicles, and more particularly such a system comprising an auxiliary pressure source and a pedal-operated brake valve through which pressure fluid from the auxiliary pressure source can be applied to the wheel brakes.

In one such brake system, a hydraulic power system is employed for operating a level control device and a brake system of an automotive vehicle. Included in the hydraulic power system is an accumulator for supplying both the level control device and the brake system. The accumulator is indirectly connected to the brake system through a pressure limiting apparatus capable of separating the brake system from the accumulator upon reaching a predetermined pressure. See West German application No. DE-OS 28 21 393.

Moreover, a brake system including a slip control for automotive vehicles, in particular, for road vehicles, is known in the art. One such system comprises a pedal-operated brake pressure generator including a master cylinder connected through pressure fluid conduits to the wheel brakes of the driven wheels, an external energy supply system, and data detectors for determining the wheel rotational pattern; and electronic circuit arrangements for logically combining the measured signals and for generating slip control signals.

The master cylinder is in communication with the auxiliary energy supply system through one or several multiple-way valves by way of which, for traction slip control, brake pressure can build up in the working chamber or chambers if the master cylinder is a tandem type, of the master cylinder and, hence, in the wheel brakes of the driven wheels. See West German application No. DE-OS 33 38 826 or its corresponding U.S. application Ser. No. 660,913, filed Oct. 15, 1984 by J. Belart et al and assigned to the assignee of this application.

SUMMARY OF THE INVENTION

It is an object of the present invention to provide a brake system including a slip control for automotive vehicles furnished with a hydraulic power system wherein the brake pressure is not applied by a master cylinder or a master cylinder including a brake force booster coupled ahead of it. The brake pressure is controlled by a brake valve connected to an auxiliary power source. The brake system of the invention should permit low-cost manufacture and, if possible, utilization of brake pressure modulators or pressure increasing or inlet valves and pressure decreasing or outlet valves, respectively, already provided on the motor vehicle, for the slip control. Finally, the brake system according to the invention should be suitable for use both with automotive vehicles provided with front wheel drive, and with automotive vehicles provided with rear wheel or all-wheel drive.

This problem, in accordance with the invention, is solved in that a first valve is provided in a pressure fluid conduit leading from the auxiliary pressure source to the wheel brakes and is capable of switching over from a locking position into a passage position. This first valve can be an electromagnetically drivable 2-way/2-position valve.

A second valve is provided in the brake conduit interconnecting the wheel brakes and the brake valve and is capable of switching over from a passage position into a locking position. This second valve can also an electromagnetically drivable 2-way/2-position valve. Moreover, a check valve is provided in the conduit branch connecting the first valve to the wheel brake to preclude pressure fluid from flowing back from the wheel brake to the first valve.

Preferably, the brake valve is operated by the brake pedal and is connected to the auxiliary pressure source. The brake valve opens the pressure fluid supply to at least two brake circuits, or it connects the said brake circuits to a pressure fluid reservoir to discontinue the supply of pressure fluid from the auxiliary pressure source.

Advantageously, one of the brake circuits is connected both to the wheel brake of the lefthand front wheel and to the wheel brake of the right-hand front wheel, with pressure modulators being switched into the two branch conduits connecting the wheel brakes in response to electric signals either to the brake valve or to the pressure fluid reservoir. The pressure modulator associated with each wheel brake comprises, for example, a 2-way/2-position valve open in the de-energized condition and a 2-way/2-position valve closed in the de-energized condition.

In a particular embodiment adapted for use with an all-wheel-drive automotive vehicle, second valves capable of switching over from a locking position into a passage position are contained in both conduits leading from the brake valve to the wheel brakes of the front wheels and to the wheel brakes of the rear wheels. The branches of the two brake conduits connecting the said second valves to the modulators are coupled ahead of the wheel brakes, through pressure conduits containing check valves connected to a first valve which, in turn, is in direct communication with the auxiliary pressure source. For that purpose, the sections of the pressure conduits connecting the check valves to the first valve are connected to the pressure fluid reservoir through a conduit containing a third valve.

BRIEF DESCRIPTION OF THE DRAWING

The invention can be achieved by various embodiments some of which are schematically illustrated in greater detail in the enclosed drawings, wherein.

DETAILED DESCRIPTION OF PREFERRED EMBODIMENT

Figure 1:
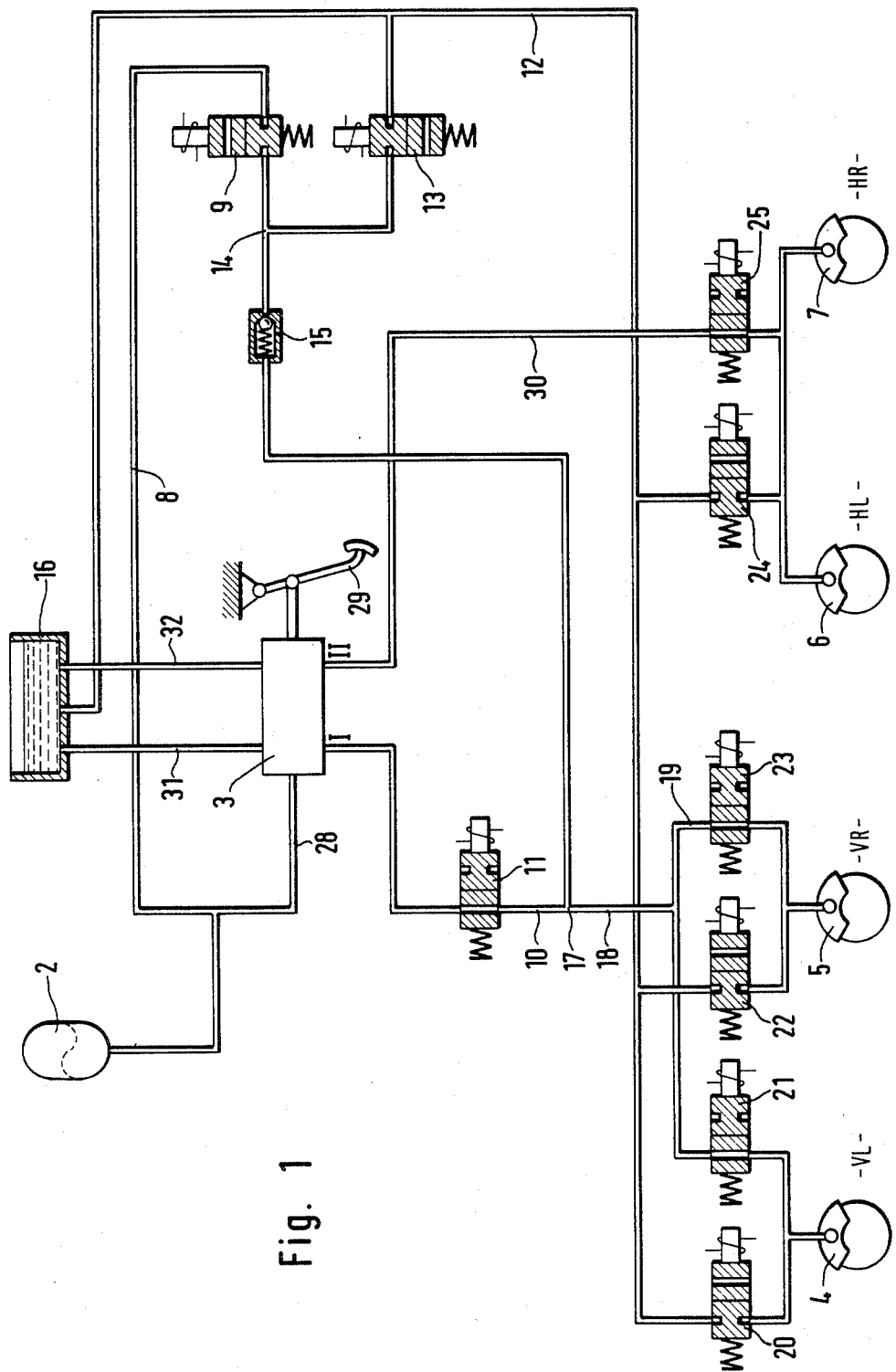
FIG. 1 shows the circuit diagram for a traction slip-controlled brake system for use with an automotive vehicle, wherein the wheel brakes are actuable through a brake pedal in communication with an auxiliary pressure source, with the pressure in the wheel brakes of the rear wheels being jointly controllable and the pressure in the wheel brakes of the front wheels being individually controllable with the aid of pressure modulators.

The brake system shown in FIG. 1 comprises an auxiliary pressure source 2 which, through a pressure conduit 28, is in communication with a brake valve 3. When the brake pedal 29 is pressed down brake pressure is supplied to the brake circuits I, II and to the brake conduits 10, 30 which communicate with wheel brakes 4, 5, 6 and 7 through pressure modulators 21, 23 and 25. The pressure modulators are 2-way/2-position valves which are open in the de-energized condition. When non-actuated the brake valve 3 connects the two brake conduits 10, 30 through the return lines 31, 32 to the pressure fluid reservoir 16 to discontinue the supply of pressure fluid from the auxiliary pressure source 2. Contained in one of the two brake conduits is a 2-way/2-position valve 11 controlling the supply of pressure fluid from the brake valve 3 into the wheel brakes 4, 5. In this embodiment the valve 11 is located in the brake conduit 10. The pressure in the wheel brakes 4 to 7, can be lowered through pressure modulators 20, 22, 24 which are 2-way/2-position valves and which are closed in the de-energized condition. The modulators 20, 22 and 24 communicate with a return line 12 so that pressure fluid can flow into the return line 12 and then into the non-pressurized pressure fluid reservoir 16.

The auxiliary pressure source 2 is also in communication with the two branch conduits 18, 19 and thus the wheel brakes 4, 5 through a pressure fluid conduit 8 having a 2-way/2-position valve 9 and a downstream check valve 15. With the valve 9 switched open, pressure fluid can flow directly from the auxiliary pressure source 2 through modulators 21, 23 into the wheel brakes 4, 5. Between the valves 9 and 15, at a section shown as 14, another valve 13 communicates with the conduit 8 and also with the return conduit 12. Thus, the brake pressure prevailing in the conduit section 14 between the check valve 15 and the 2-way/2-position valve 9 can be decreased through the third valve 13 to the return 12 and the reservoir 16.

The brake system is furnished with an electronic control (not shown because such controls are known in the art) which, with the aid of sensors disposed on the wheels of the motor vehicle, will detect the rotational pattern of the wheels and, through electric signals, will drive the pressure modulators 21 through 25 and the valves 9, 11, and 13. If the electronic control, during an accelerating operation, records that one of the two driven vehicle wheels is passing into the wheel slip range, thus commencing to slip through, the electronic control will first drive valve 11 thus causing the same to take its locking position thereby completely decoupling valve brake 3 from brake circuit I. Immediately thereafter, the valve 9 is switched into its passage (open) position such that the full pressure of the auxiliary pressure source 2, through pressure fluid conduit 8 and check valve 15, will flow into the brake conduit 10. Assuming, for example, that only wheel VL decelerated through the wheel brake 4, will pass into the wheel slip range, the electronic control will also have to drive modulator 23 to cause it to preclude brake pressure from building up in the wheel brake 5 at wheel VR. In that case, the pressure fluid flows through branch conduit 18 into the wheel brake cylinder of wheel brake 4 until the associated vehicle wheel VL is decelerated. As soon as the danger of wheel slip on vehicle wheel VL of wheel brake 4 is averted, the electronic control drives modulators 20, 21 thereby discontinuing further in-take of pressure fluid from the auxiliary pressure source 2 to enable the brake pressure in the wheel brake 4 to decrease through the modulator 20 and the return conduit 12. When the danger of wheel slip is averted, valve 9 will be reswitched into the locking position and valve 11 into the passage position. Valve 13 permits a complete pressure relief of the line section between the check valve 15 on the one hand and the valve 9 on the other hand.

Figure 2:
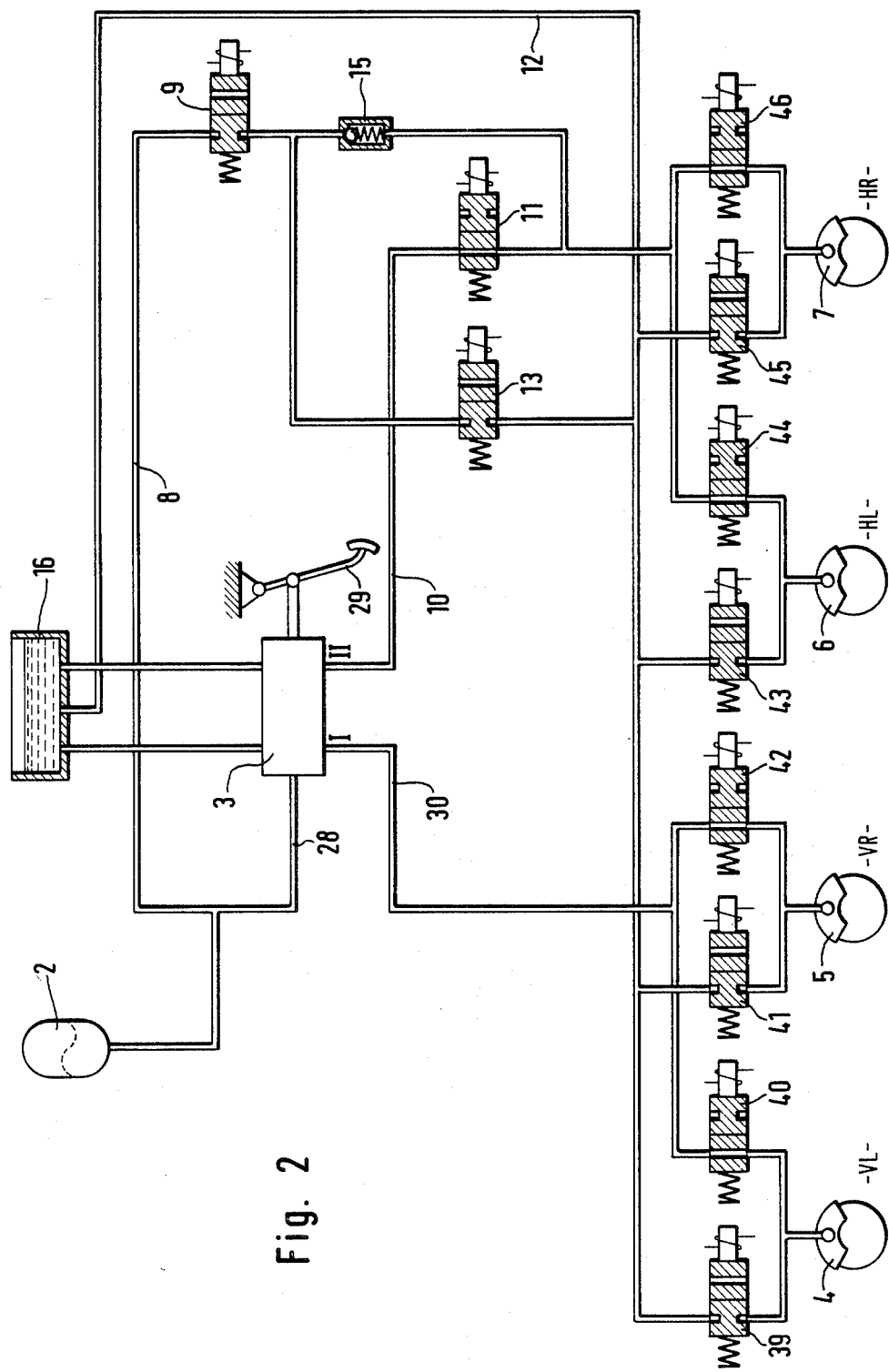
FIG. 2 shows the circuit diagram for a traction slip-controlled brake system comprising two brake circuits, with the pressure in the wheel brakes of the front wheels being jointly controllable and the pressure in the wheel brakes of the rear wheels being individually controllable with the aid of pressure modulators.

The brake system as shown in FIG. 2 is distinguished from the one according to FIG. 1 only in that it is not the wheel brakes 4, 5 of the front axle of, for example, a front-driven vehicle, that is drivable, through valve 9, by pressure fluid directly from the auxiliary power source 2, but rather the wheel brakes 6, 7 of the rear wheels, for example, in a vehicle of rear wheel drive. Hence, in the event that one of the automotive wheels HL or HR (lefthand rear wheel and right-hand rear wheel, respectively) will get into the wheel slip range, the said wheel can be decelerated directly by reswitching valve 9 until the said wheel is rolling normal.

Clearly, the pressure modulators 39 through 46 and 20 through 26, respectively, can be used together with an anti-locking brake system (known in the art and not described in any closer detail in the present instance); equally, the modulators 20 through 23 and 43 through 46, respectively, permit a deceleration of respectively both wheel brakes 4, 5 and 6, 7, respectively, of one vehicle axle, i.e., a simultaneous deceleration in the left- and right-hand front and, in the brake system according to FIG. 2, a simultaneous deceleration of the lefthand and right-hand rear vehicle wheels.

Figure 3:
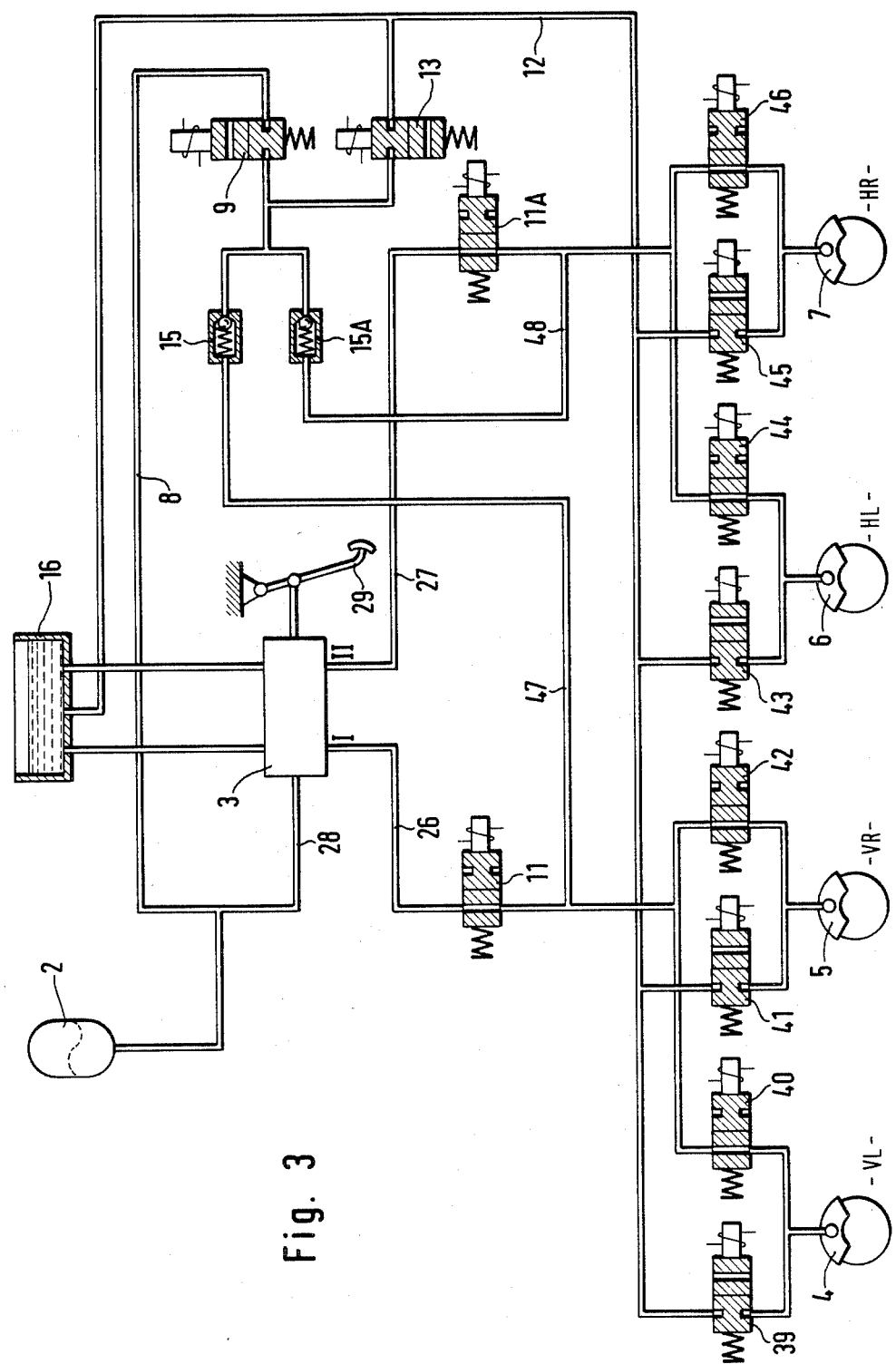
FIG. 3 shows a circuit diagram for a traction slip-controlled brake system for an all-wheel-drive automotive vehicle, wherein the two brake circuits are diagonally divided and the brake pressure of each individual wheel brake is singly controllable.

In the brake system according to FIG. 3, the brake circuit is diagonally subdivided which is particularly favorable for an all-wheel drive motor vehicle. In that instance, two valves 11, 11A are provided enabling the brake circuits I and II to be hydraulically decoupled from the brake valve 3. As the pressure conduits 47, 48 are jointly connected to the valve 9, also the wheel brakes 4 through 7 of all four vehicle wheels can be in direct communication with the auxiliary pressure source 2. One pair of modulators 39, 40; 41, 42; 43, 44 and 45, 46, respectively, (i.e. respectively one way-valve closed in de-energized condition and respectively one way-valve open in de-energized condition) are associated to each of the wheel brakes 4 through 7, each individual vehicle wheel can be individually decelerated; similarly, simultaneous or diagonal deceleration of all vehicle wheels is permitted.

Figure 4:
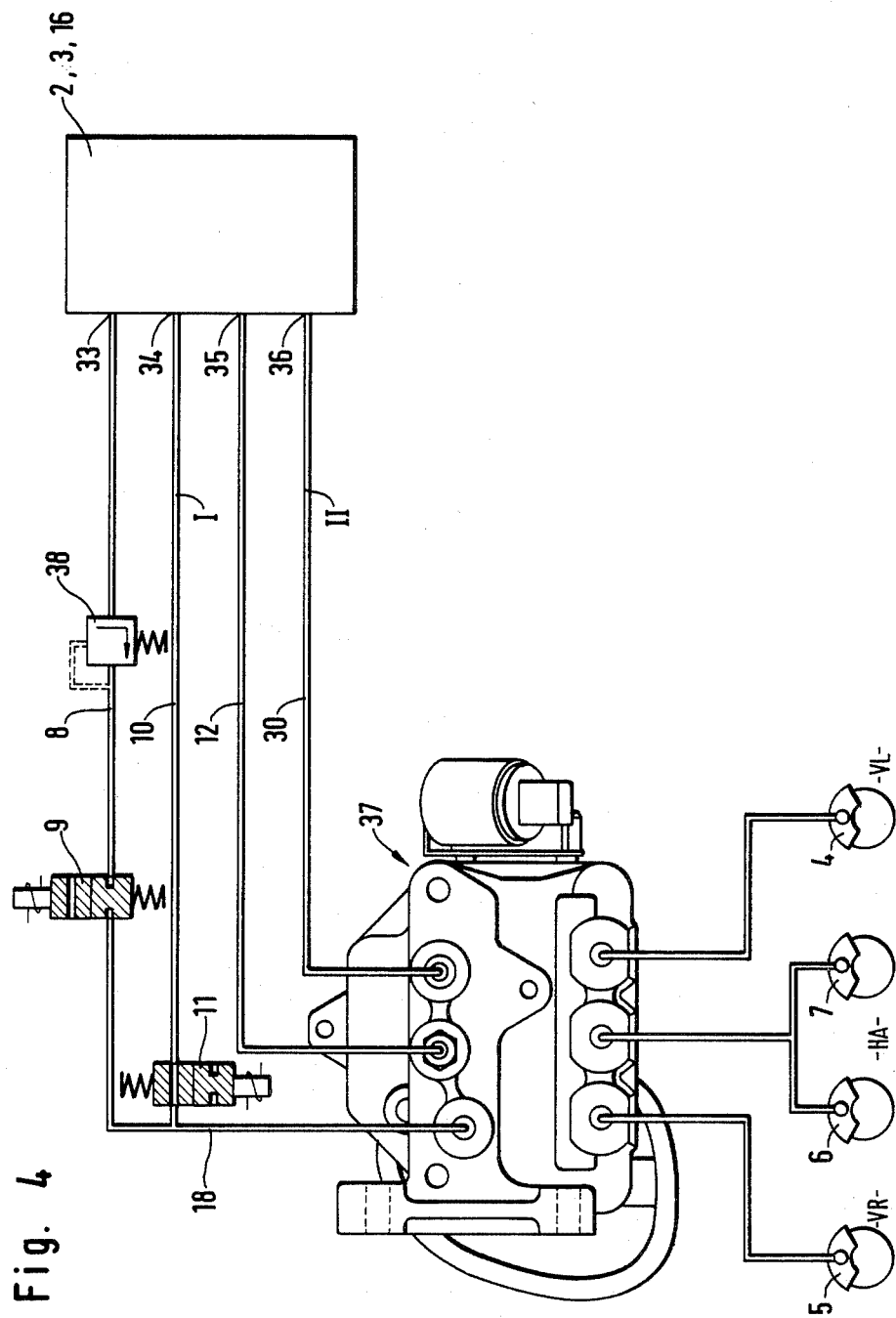
FIG. 4 shows the circuit diagram for a front-wheel drive automotive vehicle furnished with a hydraulic system, wherein an already existing valve block comprising the pressure is used.

FIG. 4 of the drawing illustrates the hydraulic system of the automotive vehicle in the form of a switch block 2, 3, 16. This hydraulic system of the automotive vehicle as a rule, comprises a hydro-accumulator, an intake reservoir, a hydro-pump, a pressure control valve, level control valves and the brake valve. Connection 33, in that instance, will establish communication between valve 9 and the accumulator; connection 34 interconnects brake conduit 10 of brake circuit I and the brake valve; connection 35 interconnects return line 12 and the reservoir while connection 36 establishes communication between brake circuit II and the brake valve. Valve block 37 comprises the pressure modulators 20 to 25. As opposed to the example of embodiment according to FIG. 1, a pressure limiting valve 38 is additionally contained between hydraulic system 2, 3, 16 of the automotive vehicle and valve 9.

What is claimed is:

1. A traction slip-controlled brake system for automotive vehicles, said system comprising an auxiliary pressure source providing the sole source of pressure for the brake system and a pedal operated brake valve through which pressure fluid from the auxiliary pressure source can be applied to wheel brakes of an automotive vehicle, a pressure fluid conduit leading from the auxiliary pressure source to the wheel brakes and a first electromagnetically drivable 2-way/2-position valve in said pressure fluid conduit being capable of switching over from a locking position into a pasage position, a brake conduit interconnecting the wheel brakes and the brake valve, a second electromagnetically drivable 2-way/2-position valve in said brake conduit being capable of switching over from a passage position into a locking position, a check valve provided in the line section interconnecting the first valve and the wheel brakes precluding pressure fluid from flowing back from the wheel brake to the said first valve.

2. A traction slip-controlled brake system for automotive vehicles, said system comprising an auxiliary pressure source and a pedal-operated brake valve through which pressure fluid from the auxiliary pressure source can be applied to wheel brakes of an automotive vehicle, a pressure fluid conduit leading from the auxiliary pressure source to the wheel brakes, and a first valve capable of switching over from a locking position into a passage position is provided in said fluid conduit, a brake conduit connecting the wheel brake to the brake valve, a second valve capable of switching over from a passage position into a locking position is provided in said brake conduit, a line branch connecting the first valve to the wheel brake, a return line connecting the wheel brakes to a pressure fluid supply reservoir, a third valve switched into the said line branch and capable of decoupling the return line, and a check valve provided in said line branch.

3. A traction slip-controlled brake system according to claim 2, wherein the brake valve is connected to the auxiliary pressure source and is operative to open the pressure fluid passage to at least two brake circuits or to connect these brake circuits to the pressure fluid supply reservoir to discontinue the supply of pressure fluid from the auxiliary pressure source.

4. A traction slip-controlled brake system according to claim 3, wherein one brake circuit is connected through a line branch both to the wheel brake of the lefthand front wheel and to the wheel brake of the right-hand front wheel, pressure modulators being located in the two branch lines for connecting the wheel brakes in response to electric signals either to the brake valve or the pressure fluid supply reservoir, the pressure modulator being 2-way/2-position valves open in de-energized condition and a 2-way/2-position valve closed in de-energized condition.

5. A traction slip-controlled brake system according to claim 3, wherein the brake conduits leading from the brake valve to the wheel brakes of the front wheels and to the wheel brakes of the rear wheels include second valves switchable from a locking position into a passage position, pressure conduits operative as branches of the two brake conduits connect the said second valves to modulators coupled ahead of the wheel brakes, said pressure conduits containing check valves connected to a first valve which valve is in direct communication with the auxiliary pressure source.

6. A traction slip controlled system according to claim 5, wherein sections of the pressure conduits connecting the check valves to the first valve are in communication with the pressure fluid supply reservoir through a line containing a third valve

* * * * *